United States Patent
Pirvulescu et al.

(10) Patent No.: US 10,697,484 B2
(45) Date of Patent: Jun. 30, 2020

(54) METHOD FOR INSTALLING A SELF-PIERCING AND SELF-CLINCHING FASTENER

(71) Applicant: RB&W MANUFACTURING LLC, Streetsboro, OH (US)

(72) Inventors: Gabriel Pirvulescu, Mississauga (CA); Michael Da Costa, Orangeville (CA); Anthony Hahn, Guelph (CA)

(73) Assignee: RB&W MANUFACTURING LLC, Streetsboro, OH (US)

( * ) Notice: Subject to any disclaimer, the term of this patent is extended or adjusted under 35 U.S.C. 154(b) by 165 days.

(21) Appl. No.: 15/890,805

(22) Filed: Feb. 7, 2018

(65) Prior Publication Data
US 2019/0242417 A1   Aug. 8, 2019

(51) Int. Cl.
| | |
|---|---|
| *B21J 15/02* | (2006.01) |
| *F16B 5/02* | (2006.01) |
| *F16B 37/06* | (2006.01) |
| *F16B 29/00* | (2006.01) |
| *B21J 15/36* | (2006.01) |
| *B21K 1/70* | (2006.01) |

(52) U.S. Cl.
CPC ........... *F16B 5/0208* (2013.01); *B21J 15/025* (2013.01); *B21J 15/36* (2013.01); *F16B 29/00* (2013.01); *F16B 37/068* (2013.01); *B21K 1/702* (2013.01)

(58) Field of Classification Search
CPC ............. F16B 5/0208; Y10T 29/49943; Y10T 29/49956; Y10T 29/5118; Y10T 29/5377; B21J 15/00; B21J 15/04; B21J 15/048; B21J 15/06
See application file for complete search history.

(56) References Cited

U.S. PATENT DOCUMENTS

| | | | | |
|---|---|---|---|---|
| 3,432,925 | A * | 3/1969 | Woolley | H01H 11/042 29/882 |
| 3,811,171 | A | 5/1974 | Grube | |
| 3,938,239 | A * | 2/1976 | Lauth | B23P 19/062 29/512 |
| 4,355,531 | A * | 10/1982 | Rosman | B21J 15/02 29/243.529 |
| 4,555,838 | A * | 12/1985 | Muller | B23P 19/062 227/55 |
| 5,560,094 | A * | 10/1996 | Ladouceur | B23P 19/062 29/243.518 |

(Continued)

*Primary Examiner* — Jason L Vaughan
*Assistant Examiner* — Amanda Kreiling
(74) *Attorney, Agent, or Firm* — Pearne & Gordon LLP

(57) ABSTRACT

A method of permanently attaching a fastener to a plastically deformable panel includes placing a fastener shearing edge in contact with a first surface of a panel and a die assembly in contact with an opposite second surface of the panel, and penetrating the fastener shearing edge through the panel to create a hole. The fastener shearing edge is driven into a swage formed as a recess in an end face of the die assembly to deform the fastener shearing edge outwards along the swage and into contact with the second surface of the panel. A bent portion of the panel is trapped between the deformed fastener shearing edge abutting the second surface of the panel and a tapered flange formed on an outer surface of the fastener that abuts the first surface of the panel. A die assembly and driving mechanism for attaching the fastener is also provided.

14 Claims, 9 Drawing Sheets

(56) References Cited

U.S. PATENT DOCUMENTS

| | | |
|---|---|---|
| 6,021,562 A | 2/2000 | Boster et al. |
| 6,220,804 B1 | 4/2001 | Pamer et al. |
| 6,409,444 B2 | 6/2002 | Pamer et al. |
| 7,740,436 B2 | 6/2010 | Pamer |
| 8,062,141 B2 | 11/2011 | Pamer |
| 9,322,424 B2 | 4/2016 | Pamer et al. |
| 9,322,426 B2 | 4/2016 | Thomas |
| 2005/0076492 A1 | 4/2005 | Goodsmith et al. |
| 2009/0056403 A1 | 3/2009 | Chanko |
| 2012/0142440 A1 | 6/2012 | Babej et al. |
| 2016/0298204 A1 | 10/2016 | Thomas |

* cited by examiner

METHOD FOR INSTALLING A SELF-PIERCING AND SELF-CLINCHING FASTENER

CROSS-REFERENCE TO RELATED APPLICATIONS

Not Applicable.

BACKGROUND

1. Field of the Invention

The following description relates generally to self-attaching fasteners and, more specifically, to self-clinching fasteners and installation tooling therefor.

2. Related Art and Background

Self-attaching fasteners, such as clinch nuts and studs, are used in many industries such as, for example, the automotive and appliance industries to secure various components to metal panels. When clinch nuts and/or studs are attached to the metal panels, screws or bolts are threaded into the clinch nuts (or onto the clinch studs) and tightened to prescribed torque values. During installation, the clinch nuts and studs must have sufficient rotational resistance to keep them from rotating relative to the metal panels when the screws are inserted and tightened. During service, the clinch nuts and studs must have sufficient pull-through resistance to keep them from pulling out of the metal panel when external forces such as, for example, vibration or other tensile forces are applied.

A clinch nuts or studs typically includes a central pilot or punch portion which at least partially extends into an opening in a metal plate or panel. When the clinch nut is self-piercing, the central pilot portion cooperates with tooling to form the opening in the metal panel when attaching the clinch nut to the metal panel. The clinch nut is attached to the metal panel by a die member which forms a mechanical interlock between the clinch nut and the metal panel. The die member typically deforms the metal panel about the opening into an annular groove of the clinch nut which encircles the pilot portion and/or deforms the pilot portion of the clinch nut over the metal panel to entrap the metal panel.

BRIEF SUMMARY OF THE INVENTION

The following presents a simplified summary of example embodiments of the invention. This summary is not intended to identify critical elements or to delineate the scope of the invention.

In accordance with one aspect, a method of permanently attaching a fastener to a plastically deformable panel is provided. The method comprises the steps of placing a fastener shearing edge in contact with a first surface of a panel and placing a die assembly in contact with a second surface of the panel that is opposite the first surface. The die assembly comprises at least two slidable components that are axially slidable relative to each other. The method further comprises driving the fastener shearing edge against the panel first surface with a pressing force in a first direction, driving the die assembly against the panel second surface with a resisting force in a second direction that is opposite the first direction, and penetrating the fastener shearing edge through the panel to create a hole so that the fastener shearing edge is disposed below the panel second surface. A perimeter of the hole being circumscribed by a bent portion of the panel that is displaced towards the die assembly. The method further comprises driving the fastener shearing edge, as the pressing force is applied, into a swage formed as a recess in an end face of one of said at least two slidable components of the die assembly and thereby deforming the fastener shearing edge in the swage to bend the fastener shearing edge outwards along the swage and into contact with the second surface of the panel. The method further comprises trapping the bent portion of the panel circumscribing the hole between the deformed fastener shearing edge abutting the second surface of the panel and a tapered flange formed on an outer surface of the fastener, the tapered flange abutting the first surface of the panel.

In accordance with another aspect, a method of permanently attaching a fastener to a plastically deformable panel is provided. The method comprising the steps of placing a circular fastener shearing edge in contact with a first surface of a panel and placing a die assembly in contact with a second surface of the panel that is opposite the first surface. The die assembly comprises an outer shell in contact with the second surface of the panel, and the outer shell is concentrically disposed about an inner sleeve with an inner sleeve end face, and the inner sleeve is concentrically disposed about a center pin with a center pin end face. The center pin end face and the fastener shearing edge are coaxial. The method includes driving the fastener shearing edge against the panel first surface with a pressing force in a first direction, and driving the center pin end face against the panel second surface with a resisting force in a second direction opposite the first direction. The center pin includes a flange that presses against an inner surface of the inner sleeve driving the inner sleeve end face against the panel second surface. The method includes penetrating the fastener shearing edge through the panel to create a hole so that the fastener shearing edge is disposed below the panel second surface, with a perimeter of the hole being circumscribed by a bent portion of the panel that is displaced towards the die assembly. The method includes driving the fastener shearing edge, as the pressing force is applied, into a swage formed as a recess in the inner sleeve end face and thereby deforming the fastener shearing edge in the swage to bend the fastener shearing edge outwards along the swage and into contact with the second surface of the panel. The method includes sandwiching the bent portion of the panel circumscribing the hole between the deformed fastener shearing edge abutting the second surface of the panel and a fastener flange formed on an outer surface of the fastener. The fastener flange abuts the first surface of the panel. The step of driving the fastener shearing edge into the swage causes at least a portion of the center pin to enter a hollow opening of the fastener that is circumscribed by the fastener shearing edge.

In accordance with a further aspect, a die assembly and driving mechanism are provided for attaching a fastener to a plastically deformable panel, with the fastener comprising a circular shearing edge configured to penetrate through the deformable panel. The die assembly comprises an outer shell with an interior shoulder surface and an inner sleeve concentrically disposed within the outer shell. The inner sleeve comprises an annular swage as a recess in an end face, and the inner sleeve further comprises a flange adapted to engage with the interior shoulder surface of the outer shell to thereby limit movement of the inner sleeve. A center pin is concentrically disposed within the inner sleeve, and the center pin comprises a tapered flange adapted to engage with a corresponding tapered interior surface of the inner sleeve to thereby limit movement of the center pin. The center pin and inner sleeve are individually slidable relative to each other and relative to the outer shell, and the outer shell is positionally secured to prevent movement of the outer shell. The driving mechanism comprises an actuator disposed on a first side of said panel and adapted to apply a pressing force to said fastener, and a driver disposed on a second side of said panel, opposite said first side, and operably coupled to a control module to apply a constant resisting force at a predetermined constant value. A piston rod is operably connected to both of the actuator and to the center pin, whereby the constant resisting force is applied to the center pin.

BRIEF DESCRIPTION OF THE DRAWINGS

Embodiments of the present application will now be described in further detail with reference to the accompanying drawings, in which.

DETAILED DESCRIPTION OF THE INVENTION

Figure 1:
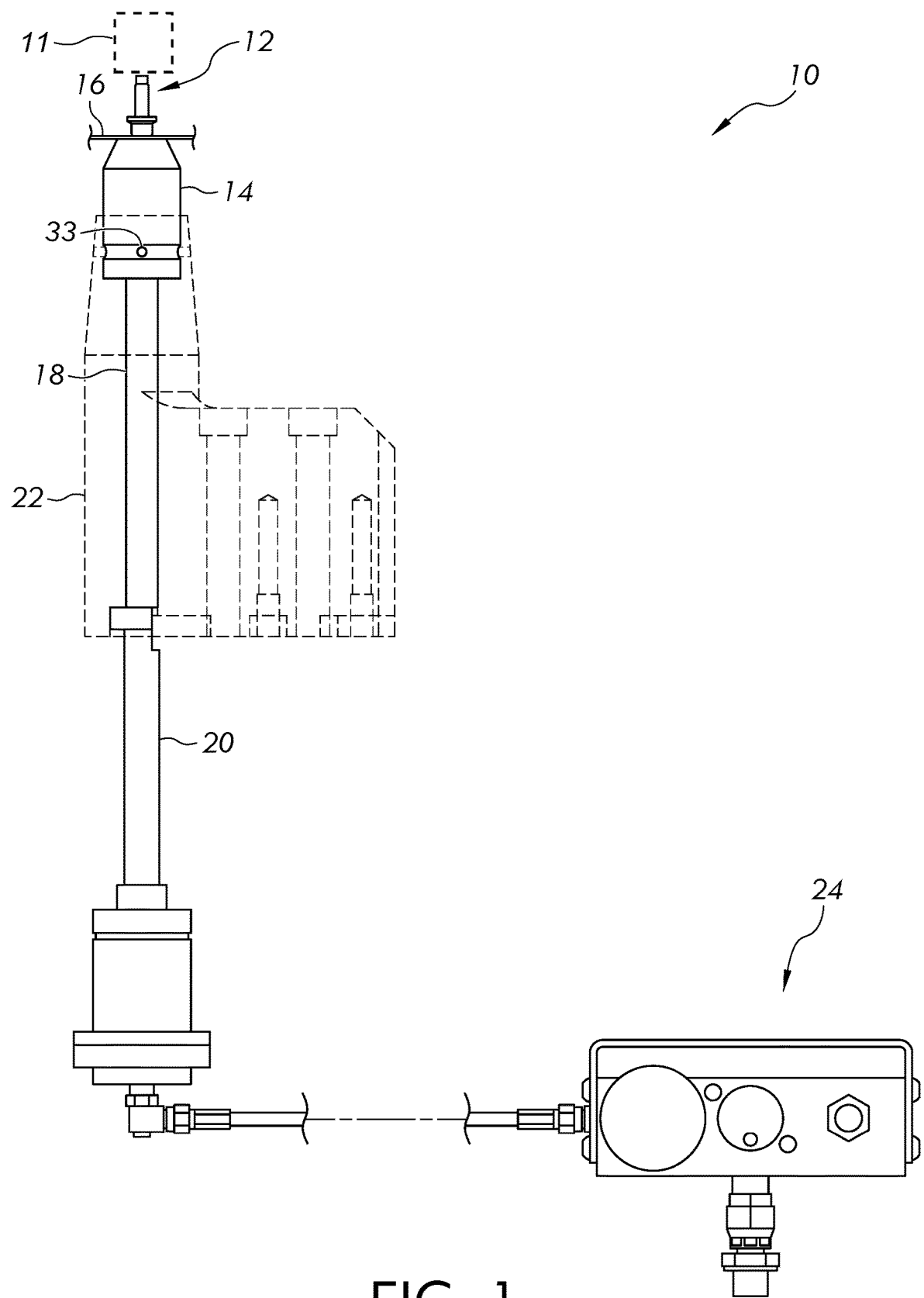
FIG. 1 is a schematic view of a self-clinching fastener press according to a first embodiment.

In the following description reference is made to the accompanying drawings which form a part thereof, and in which is shown, by way of illustration, example embodiments illustrating the principles of the present invention and how it may be practiced. It is to be understood that other embodiments may be utilized to practice the present invention and structural and functional changes may be made thereto without departing from the scope of the present invention.

Embodiments of the present invention relate to a self-clinching fastener and installation tooling therefor. The present invention will now be described with reference to the drawings, wherein like reference numerals are used to refer to like elements throughout. It is to be appreciated that the various drawings are not necessarily drawn to scale from one figure to another or within a given figure. Also, the sizes of the components are somewhat arbitrarily drawn in order to facilitate an understanding of the drawings. In the following description, numerous specific details are set forth in order to provide a thorough understanding of the present invention, but it can be possible in certain instances to practice the present invention without those specific details. Additionally, the examples discussed are not intended to be a limit on the invention. For example, one or more aspects of the disclosed examples can be utilized in other examples and even other types of apparatus, devices, and methods.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the invention in any manner. It is to be understood that embodiments presented herein are by way of example and not by way of limitation. The intent of the following detailed description, although discussing example embodiments, is to be construed to cover all modifications, alternatives, and equivalents of the embodiments as may fall within the spirit and scope of the invention.

In general, clinch nuts and studs have an annular indentation into which a portion of a metallic substrate is forced into thereby locking the clinch nut in place. This method results in a permanent attachment between the clinch nut and the metallic substrate. The metallic substrate is sheared while being pressed into the clinch nut. Various examples of clinch nuts and studs can be found in Applicant's previous patents, such as U.S. Pat. Nos. 6,220,804; 6,409,444; 7,740,436; 8,062,141; 9,322,424; 9,322,426 and/or U.S. Publication No. 2016/0298204, all of which are expressly incorporated by reference herein in their entirety. Typically, clinch nuts and studs are attached into various types of steel. Where the metallic substrate is malleable, such as aluminum or other relative soft metal or even plastic, the common method of pressing the substrate into a groove in the nut may not create a permanent bond because the metal is not rigid enough to support the bond. Additionally, it may be difficult to properly shear the substrate because the substrate bends and/or spreads/smears before shearing. Therefore, it would be helpful to have a technique and corresponding tooling for attaching self-fastening nuts to malleable substrates.

Turning to FIG. 1, illustrated is one embodiment of a press, indicated generally at 10, that includes a fastener 12, a top forming die 11, and a die assembly 14. For brevity, the fastener 12 described and illustrated in this application will be of a clinch stud type (i.e., a male fastener); however, it is to be understood that the fastener 12 could likewise be a clinch nut (i.e., a female fastener). In between the fastener 12 and the die assembly 14 is a plastically deformable panel 16 (e.g. metal, plastic, etc.). The fastener 12 is located in contact with a first face of the panel 16, while the die assembly 14 is in contact with a second, opposite face of the panel 16. In an embodiment, the fastener 12 is configured to deform the panel 16 so as to attach the fastener 12 thereto. In this example, the top forming die 11 is a moving die that presses upon the fastener 12, and the die assembly 14 is a stationary die. In operation, an actuator (not shown) forces the moving top forming die 11 to in turn force the fastener 12 to penetrate through the plastically deformable panel 16, as will be described herein, and to squeeze the plastically deformable panel 16 between the fastener 12 and the stationary die assembly 14, thereby deforming a portion of the plastically deformable panel 16 into an annular indentation to clinch the fastener 12 in place. Both the fastener 12 and the die assembly 14 can be configured to provide opposing forces against opposing sides of the panel 16. The panel 16 can comprise any suitable substrate. Any suitable condition (e.g. temperature, thickness) of the panel 16 at the point where the fastener 12 is attached to the panel 16 is contemplated and may depend on the substrate used in the panel 16.

As shown in FIG. 1, the stationary die assembly 14 can be connected to a piston rod 18 which is further connected to a driver 20. Optionally, the piston rod 18 and driver 20 could be a unitary element. The driver 20 is configured to move the piston rod 18, and by extension at least a portion of the die assembly 14, in a linear direction. The piston rod 18 can be at least partially housed in a piston rod housing 22 (shown in an outline in FIG. 1). It is to be understood that the piston rod housing 22 can have any desired shape, and the illustrated embodiment is only one possible example for use with various tooling. The dimensions of the piston rod 18 can vary based on the preferred spacing of the components, the location of the panel 16, the weight of the die assembly 14, or any other factor.

In the illustrated embodiment, the driver 20 is connected to a pressure regulator and/or control module 24. The control module 24 is used to increase and/or decrease pressure on an end of the driver 20, and thereby the piston rod 18, thus moving the driver 20 in a linear direction. The pressure regulator and/or control module 24 is used to ensure a continuous and specific force is applied to the piston rod 18 to thereby oppose the force applied to the panel 16 by the moving top forming die 11 and fastener 12. The pressure can be supplied by any preferred mechanism, including pneumatic (e.g. compressed air, nitrogen, or other working gas), hydraulic. Optionally, the pressure regular and/or control module 24 could utilize a direct force system, such as a linear actuator or even a spring. In the case of pneumatics, the driver 20 would comprise a pneumatic actuator. The control module 24 can be fluidly connected to a tank that supplies the preferred substance.

Figure 2:
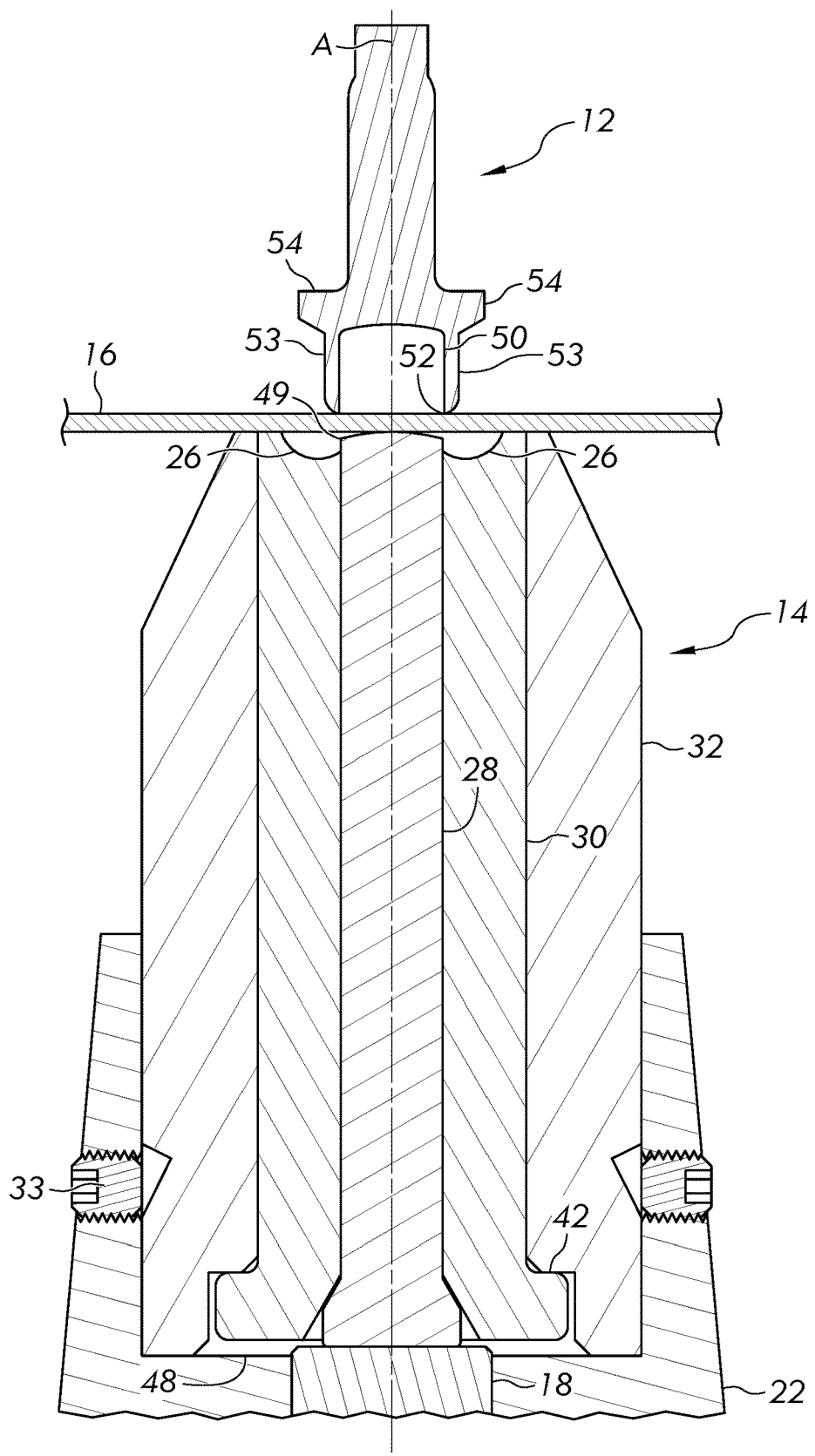
FIG. 2 is a sectional view of a self-clinching fastener and a die assembly according to a second embodiment.

Turning to FIG. 2, illustrated is one embodiment of the die assembly 14 that includes a first end face and a swage 26 (i.e., a tool, die, or stamp for giving a particular shape to metal on an anvil) formed thereon. In the illustrated embodiment, the die assembly 14 includes a center pin 28, an outer shell 32, and an inner sleeve 30 therebetween which are concentric about a central axis A. The inner sleeve 30 includes the swage 26 discussed above. The center pin 28, inner sleeve 30, and outer shell 32 can be arranged such that the center pin 28 and inner sleeve 30 can move axially along the central axis A with respect to the outer shell 32 (and also with respect to each other). The die assembly 14, or a portion thereof, can be secured to the piston rod housing 22. In one embodiment, the outer shell 32 is secured to the piston rod housing 22, for example by bolts 33 (FIG. 2) and does not move (i.e., it is stationary).

Figure 3C:
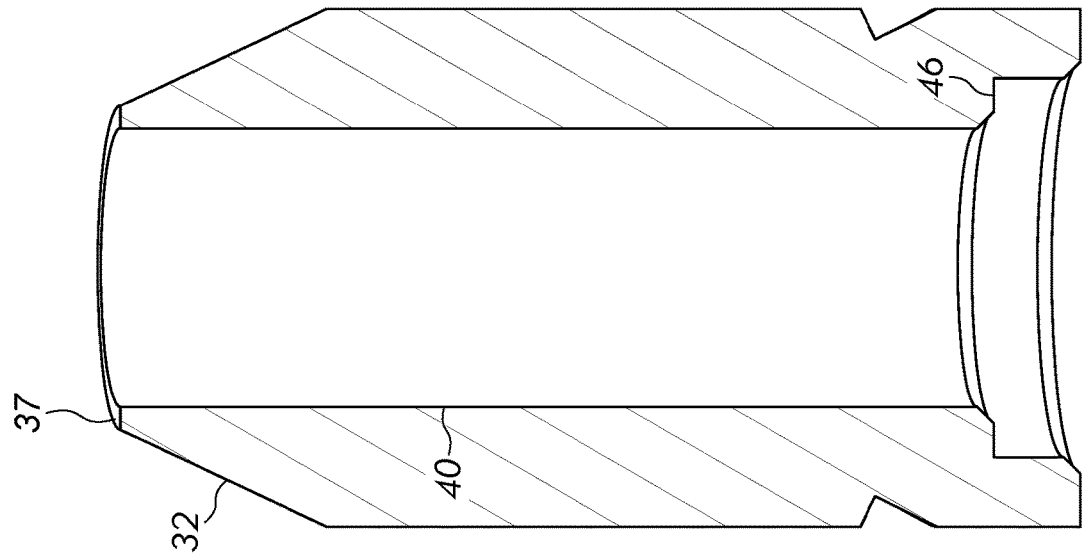
FIG. 3C is a sectional view of an outer shell according to the embodiment of FIG. 2.

In the illustrated embodiment, the center pin 28 is operatively connected to the piston rod 18 such that the piston rod 18 can drive the center pin 28 axially along the central axis A. In one example, the center pin 28 can be operatively connected to the piston rod 18 via abutment whereby the piston rod 18 contacts and presses upon the bottom surface of the center pin 28 to thereby move the center pin 28, although the parts are separate and not physically joined together. Alternatively, the center pin 28 may be physically joined together with the center pin 28 in any known manner, such as by a threaded connection, suitable fastener, interlocking connection, adhesive/welding, or can even be a single monolithic body so that they move together as a single unit in all directions. As shown in FIG. 3A, the center pin 28 can include a flange, in the illustrated embodiment the flange is a tapered surface 34, configured to press against a surface 38 (FIG. 3B) of the inner sleeve 30 such that driving the center pin 28 axially can also drive the inner sleeve 30 axially. In the illustrated embodiment, the center pin 28 is cylindrical; however, the center pin 28 can take any shape consistent with the desired use. An edge 49 of an end face 39 of the center pin 28 forms a die assembly shearing edge 49 (FIG. 2) that will help the fastener 12 deform the panel 16, as will be further described below.

Figure 3B:
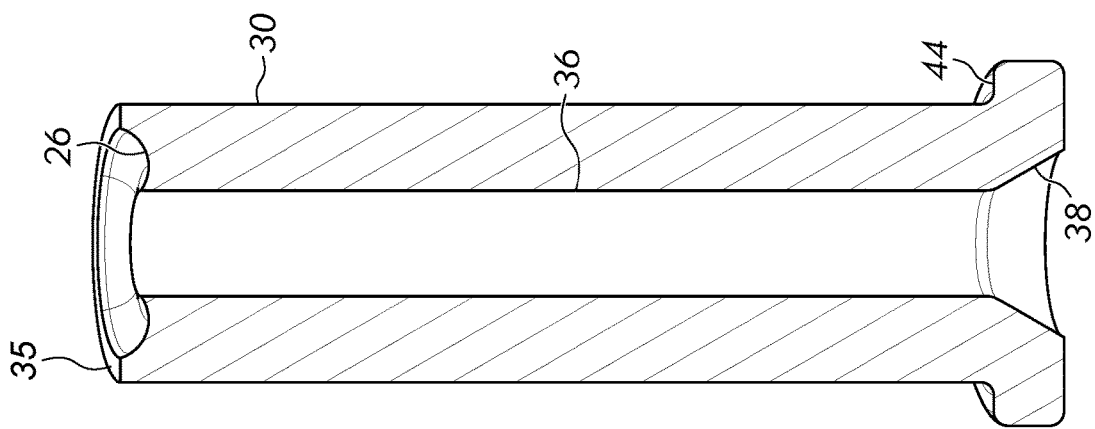
FIG. 3B is a sectional view of an inner sleeve according to the embodiment of FIG. 2.
Figure 3A:
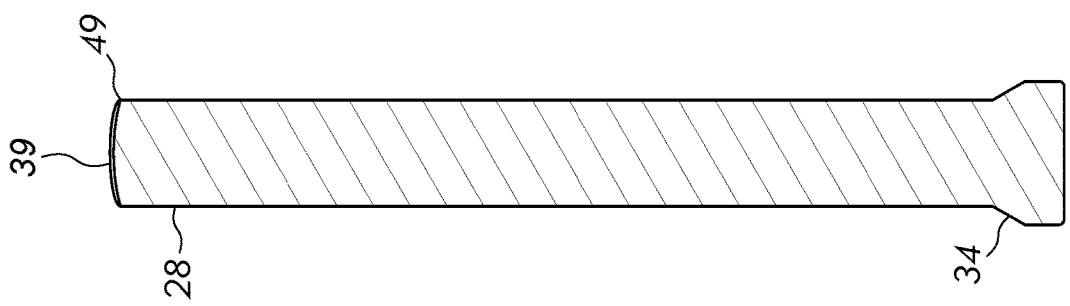
FIG. 3A is a sectional view of a center pin according to the embodiment of FIG. 2.

As shown in FIG. 3B, the inner sleeve 30 includes an inner sleeve bore 36 configured to slidably receive the center pin 28. The inner sleeve bore 36 can be centrally located in the inner sleeve 30 or can be offset from center. The inner sleeve bore 36 can take any shape that is consistent with the desired purpose of allowing the center pin 28 to move axially in the inner sleeve bore 36. For example, where the center pin 28 is cylindrical, the corresponding inner sleeve bore 36 can also be cylindrical. The inner sleeve bore 36 can include a surface that the center pin tapered surface 34 presses against. In an embodiment illustrated in FIG. 3B, the inner sleeve bore 36 includes an outwardly tapered surface 38 that the center pin tapered surface 34 can press against. An angle of the inner sleeve tapered surface 38 can be similar to an angle of the center pin tapered surface 34 or the two can be different. Like the center pin 28, in the illustrated embodiment, the inner sleeve 30 is cylindrical; however, the inner sleeve 30 can take any shape consistent with the desired use. When the surfaces 34, 38 of the center pin 28 and inner sleeve 30 are in abutment, the end face 35 of the inner sleeve 30 and the end face 39 of the center pin 28 can be configured to be coplanar. Optionally, if the center pint 28 has a curved or convex geometry, at least the uppermost point can be coplanar with the end face of the inner sleeve.

Turning to FIG. 3C, similar to the inner sleeve 30, the outer shell 32 includes an outer shell bore 40 configured to slidably receive the inner sleeve 30. The outer shell bore 40 can be centrally located in the outer shell 32 or can be offset from center. The outer shell bore 40 can take any shape consistent with the desired purpose of allowing the inner sleeve 30 to move axially in the outer shell bore 40. For example, where the inner sleeve 30 is cylindrical, the corresponding outer shell bore 40 can be cylindrical.

In the illustrated embodiments, similar to the center pin 28 and the inner sleeve 30, the outer shell 32 can be also cylindrical; however, the outer shell 32 can take any desired shape. The outer shell 32 can further include a tapered outer surface adjacent an outer shell end face. The outer shell 32 can yet further include an indentation or annular groove formed on an outer surface of the outer shell 32 configured for receiving the bolts 33 or stud screws that secure the outer shell 32 to the piston rod housing 22.

In an assembled position (see FIG. 2), the inner sleeve 30 is configured to travel axially between two stops. The first stop prevents axial movement of the inner sleeve 30 in a first direction and the second stop prevents axial movement of the inner sleeve 30 in a second direction opposite the first direction.

A so-called upper stop 42 (shown in FIGS. 2, 3B, and 3C), is formed by a shoulder surface 46 in the outer shell 32. Because the outer shell 32 is stationary due to being fixedly restrained, the inner sleeve 30 presses against the shoulder surface 46 to prevent further axial movement of the inner sleeve 30 in an upwards direction (as viewed in FIG. 2) along the central axis A. In one embodiment shown in FIGS. 2 and 3B, the inner sleeve 30 includes an outward extending flange or protrusion 44 that interacts with the shoulder surface 46. In one embodiment, the protrusion 44 can be an annular flange. The corresponding shoulder surface 46 can be formed by the outer shell bore 40 having a stepped diameter where a first larger diameter, that is adjacent a second smaller diameter, is configured to receive the inner sleeve protrusion 44. When the inner sleeve 30 is at the upper stop 42, the interaction between the center pin tapered surface 34 and the inner sleeve tapered surface 38 can also prevent axial movement of the center pin 28 along the same direction. At the upper stop 42, an end face 35 of the inner sleeve and an end face 37 of the outer shell can be configured to be coplanar (see FIG. 2).

The second stop is formed by a surface in the piston rod housing 22 and is a so-called a lower stop 48 (shown in FIG. 2). As will be described, a bottom surface of the inner sleeve 30 can contact the lower stop 48 to limit movement of the inner sleeve 30 to a maximum distance. However, the piston rod housing 22 has a hole extending therethrough that allows the center pin 28 to pass therethrough and avoid the lower stop 48.

Turning now to the swage 26, in the embodiment illustrated in FIGS. 2 and 3B, the swage 26 is formed in an end face of the inner sleeve 30. The swage 26 is configured to act as a confining die as the panel 16 is pressed into the die assembly 14 by the fastener 12, as will be described below. In the illustrated embodiment, the swage 26 is a continuous annular depression located in the end face 35 of the inner sleeve 30, however the swage 26 can take any shape consistent with the desired use, such as stepped depressions or a plurality of separate depressions. In the illustrated embodiment, the swage 26 is defined along an outer edge by the inner sleeve 30. The swage 26 begins at the inner sleeve bore 36, and extends in a curved direction towards the end face 35. In the shown embodiment, the swage 26 has a generally concave geometry with a lowest most point located between the inner sleeve bore 36 and the end face 35 (i.e., the swage 26 geometry may curve upwards as it approaches the inner sleeve bore 36), although it is contemplated that various other geometries can be utilized. The swage 26 can be curved to guide the plastically deformed shearing edge 49 of the fastener 12 during installation, preferably outwards (i.e., away from the central axis A) and upwards (i.e., towards an underside of the panel 16, as will be described below. As shown in FIG. 2, the center pin 28 can extend above the swage 26 interrupting the depression. A terminal edge of the swage 26 can be immediately adjacent to and constrained by the center pin 28, and when the end face 35 of the inner sleeve 30 is co-planar with the end face of the center pin 28, the swage 26 is spaced a distance below the end face of the center pin 28 to create a void below the second surface of the panel that can receive the displaced or bent portion of the panel and/or the fastener shearing edge.

Returning to FIGS. 1 and 2, the fastener 12 can have a generally cylindrical-shaped body with a panel-engaging end face or surface. An axially extending bore or opening 50 forms a piercing or shearing edge 52 at an inner edge of the fastener end face. The die assembly shearing edge 49 (FIGS. 2 and 4A-4E) of the center pin 28 can be sized and shaped to cooperate with the fastener shearing edge 52 to perforate or shear the panel 16 during installation of the fastener 12 on the panel 16. The fastener opening 50 can be centrally located on the fastener end face or can be offset from center. Generally, it is to be appreciated that any or all of the center pin 28, inner sleeve 30, and/or outer shell 32 can be sized properly for the particular fastener 12 and/or panel 16 to be secured together.

The fastener 12 can further include a protrusion, forming a flange 54, that extends outwardly from the fastener body. The illustrated flange 54 is polygonal with a tapered surface on the lower side of the flange 54; however, the flange 54 can take any shape consistent with the desired purpose. The flange 54 can extend around the fastener body continuously or a portion(s) thereof. A portion of the fastener body, a so-called securing portion 53, is configured to be deformed to cooperate with the flange 54 to secure the fastener 12 to the panel 16. The securing portion 53 can extend from the flange 54 to the fastener end face. It is to be appreciated that the fastener 12, and its various aspects, can include any of the features of Applicant's previous patents that have been incorporated herein by reference.

The fastener end face is sized to cooperate with the die assembly end face to create a constriction and/or pinching action upon the panel 16 thereby compacting the panel 16 into the swage 26, as will be described below. The fastener end face can be generally annular-shaped and sized to cooperate with and/or extend into the swage 26. In one embodiment, the fastener end face is perpendicular to the central axis A. The fastener end face can take any shape or form consistent with the desired purpose (e.g. angled, stepped). The shape of the fastener end face can be based on the shape of the swage 26. For example, where the swage 26 comprises a plurality of separate depressions, the securing portion 53 can comprise a plurality of fingers forming a plurality of spaced end faces spaced according to the arrangement of the separate depressions of the swage 26.

The outer periphery of the fastener end face can be circular or polygonal. The fastener shearing edge 52 can take any preferred shape, i.e. circular, rectangular, triangular, etc. The fastener shearing edge 52 and the die assembly shearing edge 49 can be similarly shaped or can vary.

Turning to FIGS. 4A-4F, a method of attaching the fastener 12 to the panel 16 will now be described. The fastener 12 and the die assembly 14 are located on opposite sides of the panel 16 at a position where the fastener 12 is to be secured to the panel 16 (best seen in FIG. 2), and preferably the fastener 12 and the die assembly are coaxially positioned along the central axis A. The die assembly shearing edge 49 and the fastener shearing edge 52 are relatively moved toward one another along the central axis A and, in an initial position, are brought into contact with opposing sides of the panel 16. In the embodiment illustrated in FIG. 2, when the shearing edges 49, 52 are first brought into contact with the panel 16, the upper and lower surfaces of the panel 16 are perpendicular to the central axis A; however, the panel can have any orientation suitable for the desired use. For example, it is contemplated that the system and method described herein could also be used on a curved or angled panel in which the upper and/or lower surface of the panel 16 are not perpendicular to the central axis A.

Bringing the die assembly shearing edge 49 into contact with the panel 16 can include providing a press force via the top forming die 11 (applied from an actuator, not shown) in a first direction (indicated by the arrow "B") that presses the fastener 12 into contact with the upper surface of the panel 16. An opposite resisting force is provided by the center pin 28 upon the lower surface of the panel 16, applied via the piston rod 18 in a second direction (indicated by the arrow "C") opposite the first direction B. The pressure regulator and/or control module 24 is used to ensure that the resisting force is applied to the center pin 28 via the piston rod 18 is a continuous and specific force to thereby oppose the press force applied to the panel 16 by the moving top forming die 11 and fastener 12. Initially, the resisting force can press the center pin tapered surface 34 against the inner sleeve tapered surface 38 which in turns drives the inner sleeve 30 in the first direction B. The tapered surfaces 34, 38 can be configured such that when the center pin 28 is in contact with the panel 16, the end face 35 of the inner sleeve 30 is similarly in contact with the panel 16. In addition or alternatively, the piston rod housing 22 and the panel 16 can be placed adjacent each other such that the end face 37 of the outer shell is in contact the panel 16 to provide additional support to the panel 16. The end face 37 of the outer shell can be maintained in this position during the fastening process to thereby support the underside of the panel 16.

In one embodiment, to prevent the center pin 28 from bending or otherwise pushing the panel 16 away from the die assembly 14, the upper stop 42 can be positioned such that when the end face 35 of the inner sleeve 30 makes contact with the underside of the panel 16, the inner sleeve protrusion 44 abuts the shoulder surface 46 to thereby stop further movement of the inner sleeve 30 in the second direction C. In this configuration, the stopping of further movement of the inner sleeve 30 in the second direction C also causes the center pin 28 to stop further movement in the second direction C due to the interaction between the tapered surfaces 34, 38 (i.e., the tapered surface 34 engages the tapered surface 38, while the protrusion 44 engages the shoulder surface 46). In another embodiment, the press 10 can includes a sensor that is configured to stop movement of the inner sleeve 30 and/or center pin 28 in the first direction B by stopping travel of the piston rod 18 in the second direction C once the inner sleeve 30 contacts the panel 16. Any suitable mechanism can be used to prevent the center pin 28 from bending the panel 16 away from the die assembly 14.

In the initial position, since the upper stop 42 prevents further movement of the center pin 28 in the second direction C, the piston rod 18 can continue pressing the center pin in the second direction C with the resisting force so as to maintain the center pin 28 in contact with the underside of the panel 16.

The fastener 12 is driven along the central axis A in the first direction B by the press force supplied by the actuator to the top forming die 11 in any suitable manner, such as a mechanical press or a hydraulic or pneumatic plunger. Movement of the fastener 12 in the first direction B causes the shearing edges 49, 52 to cooperate on the opposite sides of the panel 16 to shear or punch an opening in the panel 16 (see FIG. 4A). A resulting punched out portion of the panel, a metal slug 56, can be forced into the hollow fastener opening 50.

Figure 4A:
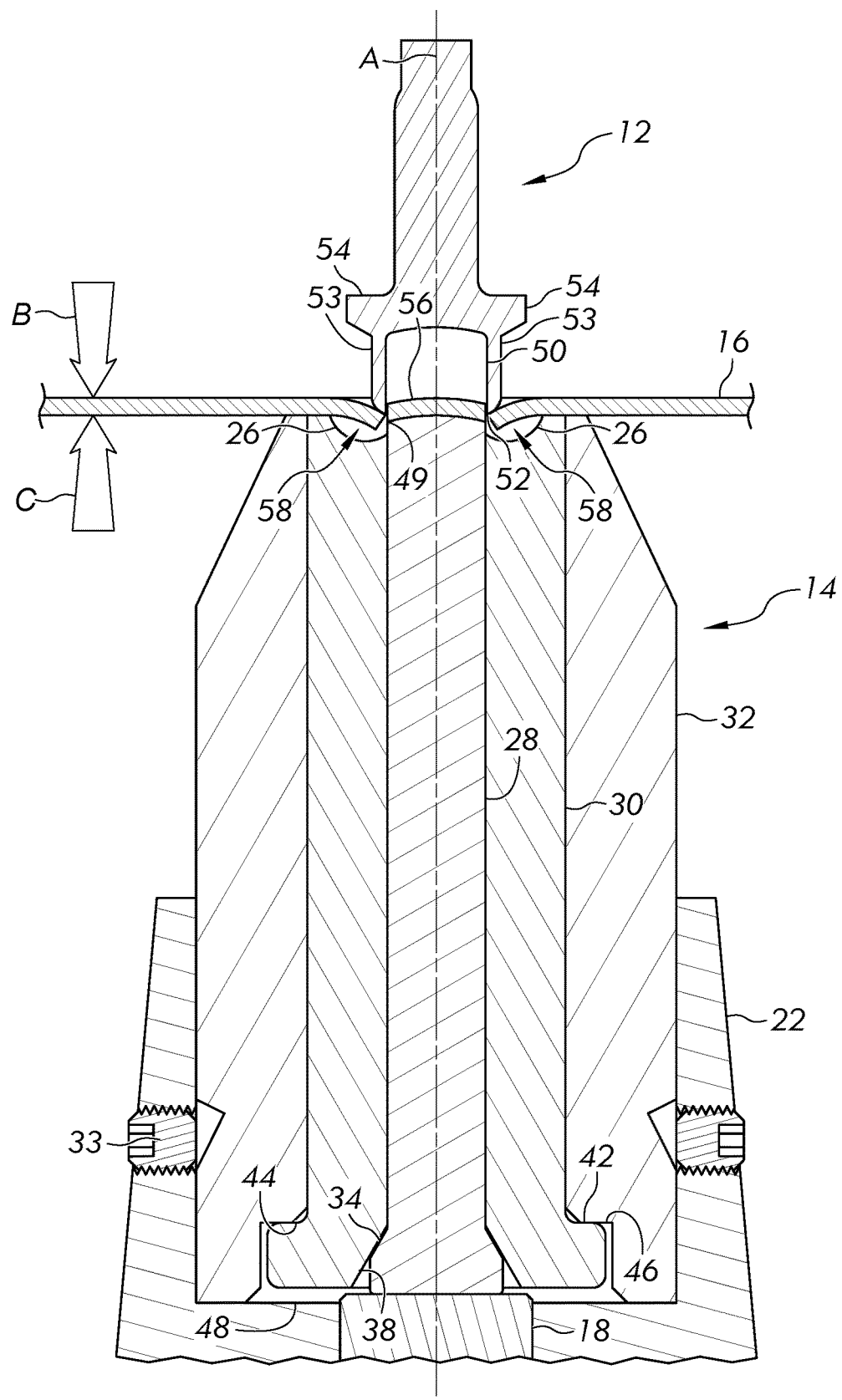
FIGS. 4A-4F are sectional views of various steps of a method of attaching a self-clinching fastener to a panel according to a third embodiment.
Figure 4B:
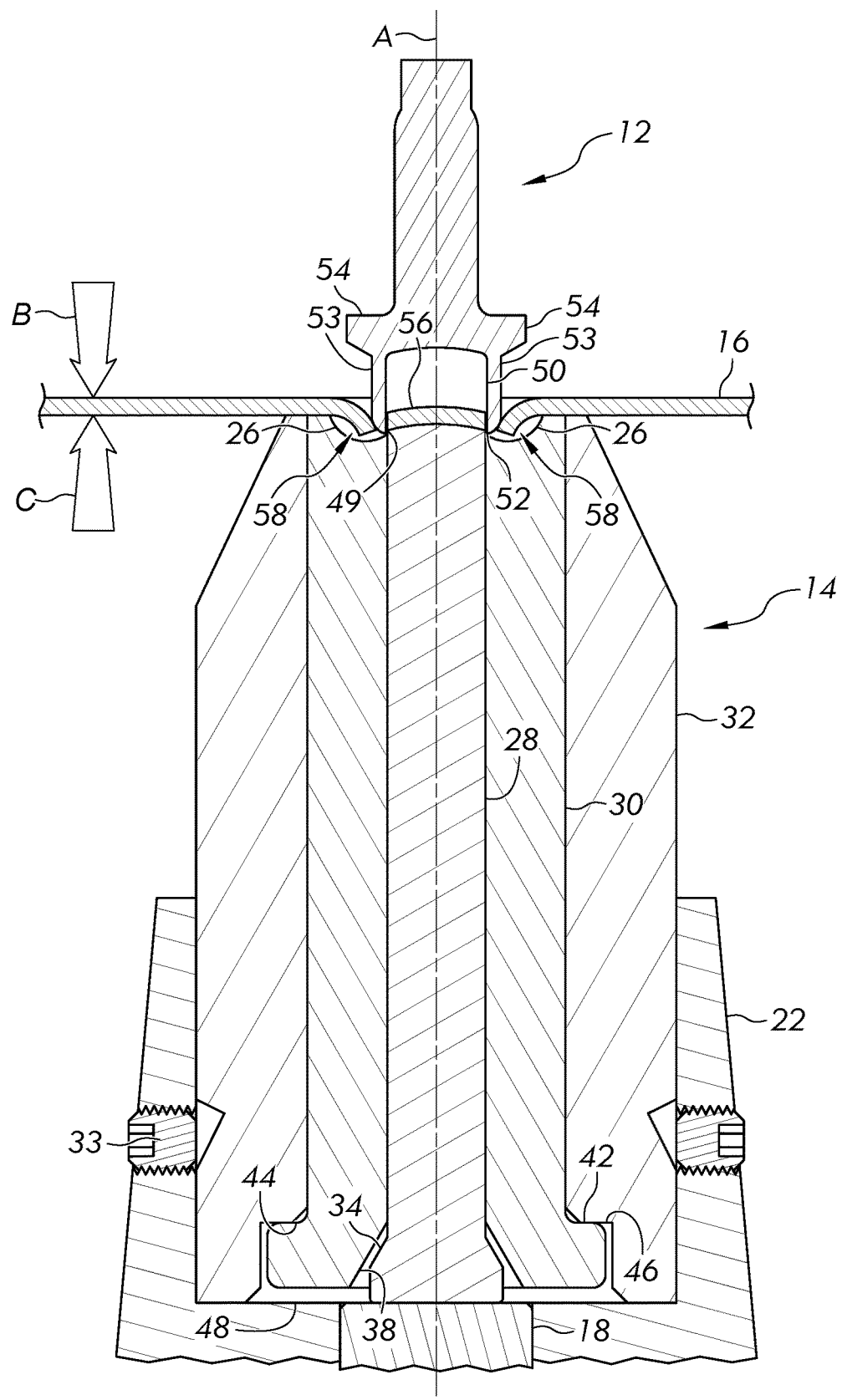

Turning now to FIG. 4B, after the metal slug 56 is sheared out of the panel, the fastener 12 continues to move in the first direction B along the central axis A driven by actuator to the top forming die 11. The inertia of punching out/shearing the metal slug 56 and the movement of the fastener 12 drives a displaced or bent portion (indicated generally at 58) of the panel 16 in the first direction B toward the swage 26. The bent portion 58 generally circumscribes the punched out hole/metal slug 56. As can be seen, the displaced or bent portion 58 of the panel 16 curves toward the die assembly 14, and specifically the swage 26, with a fulcrum point located about the point of contact between the end face 35 of the inner sleeve 30 and the panel 16.

After the punching out/shearing action, further movement of the fastener 12 in the first direction B thereby causes the metal slug 56 and the bent portion 58 of the panel to likewise travel toward the die assembly 14. Either by direct contact and/or frictional engagement between the fastener 12 and the center pin 28 (i.e., by engagement of the fastener shearing edge 52 and center pin, and/or frictional engagement of the fastener opening 50 and the metal slug 56), the center pin 28 is forced to travel in the first direction B. This movement of the center pin 28 occurs because the press force via the top forming die 11 (applied by the fastener 12) is greater than and overcomes the resisting force supplied by the control module 24 (and applied to the center pin 28 via the piston rod 18). In the illustrated embodiment, the center pin 28 travels in the first direction B until the piston rod 18 is planar with the lower stop 48; however, the center pin 28 can be moved to any suitable position. Optionally, movement of the center pin 28 in the first direction B can be facilitated by lowering the resisting force applied by the piston rod 18 such that the downward press force on the center pin 28 can more easily moves the center pin 28 in the first direction B.

Figure 4C:
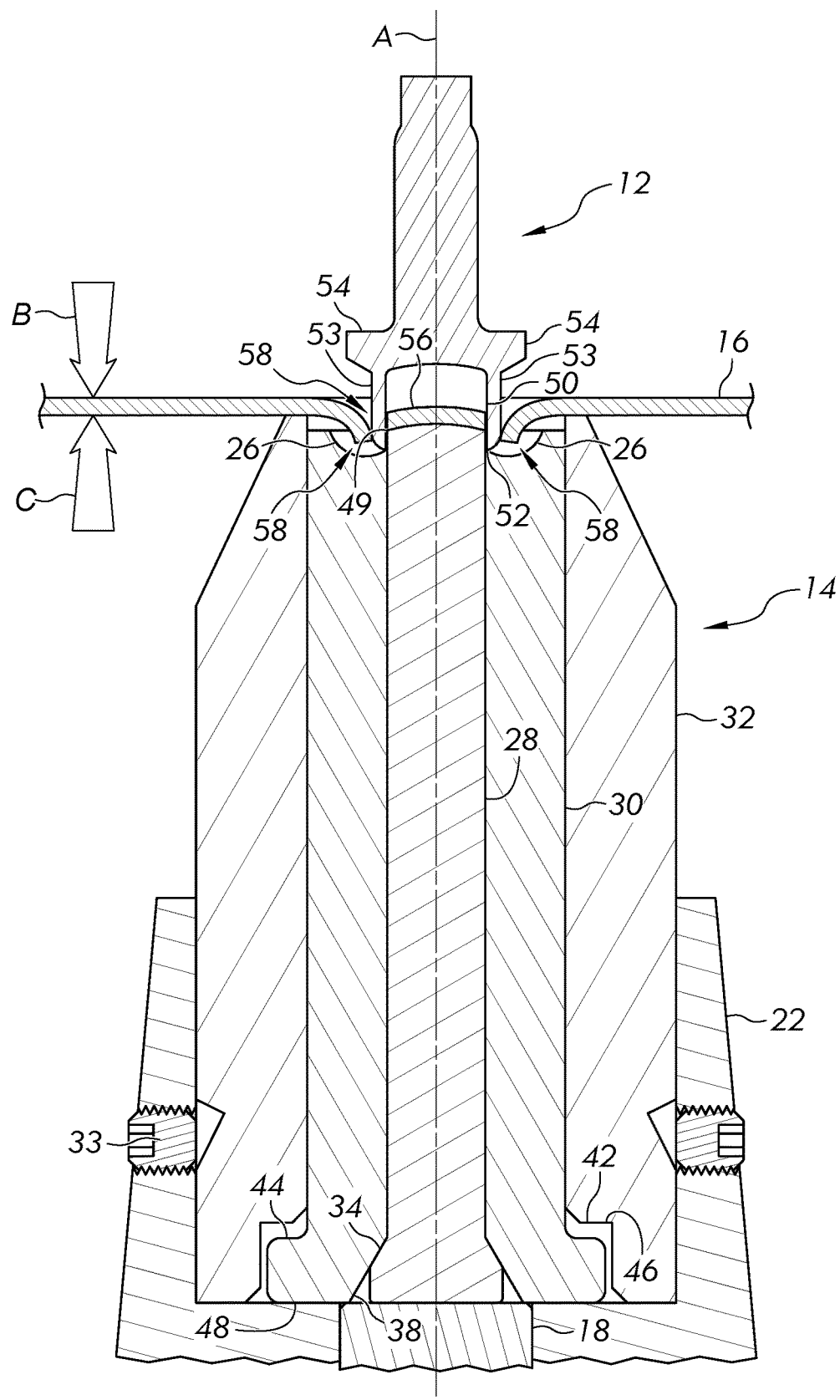

Turning to FIG. 4C, as the fastener 12 continues traveling in the first direction B, the fastener shearing edge 52 will contact the inner sleeve 30 and drive the inner sleeve 30 a distance in the first direction B and into abutment with the lower stop 48. At that point, the inner sleeve 30 has traveled a maximum distance and no further downward movement of the inner sleeve 30 is possible. The distance that the end face 35 and swage 26 of the inner sleeve 30 is displaced is sufficient to enable the fastener shearing edge 52 to be located vertically below the bent portion 58 of the panel circumscribing the hole created when the fastener 12 penetrated the panel. As the fastener 12 continues traveling in the first direction B, the fastener shearing edge 52 will travel along the swage 26 in an outwards direction beyond and underneath the edge of the bent portion 58.

Figure 4D:
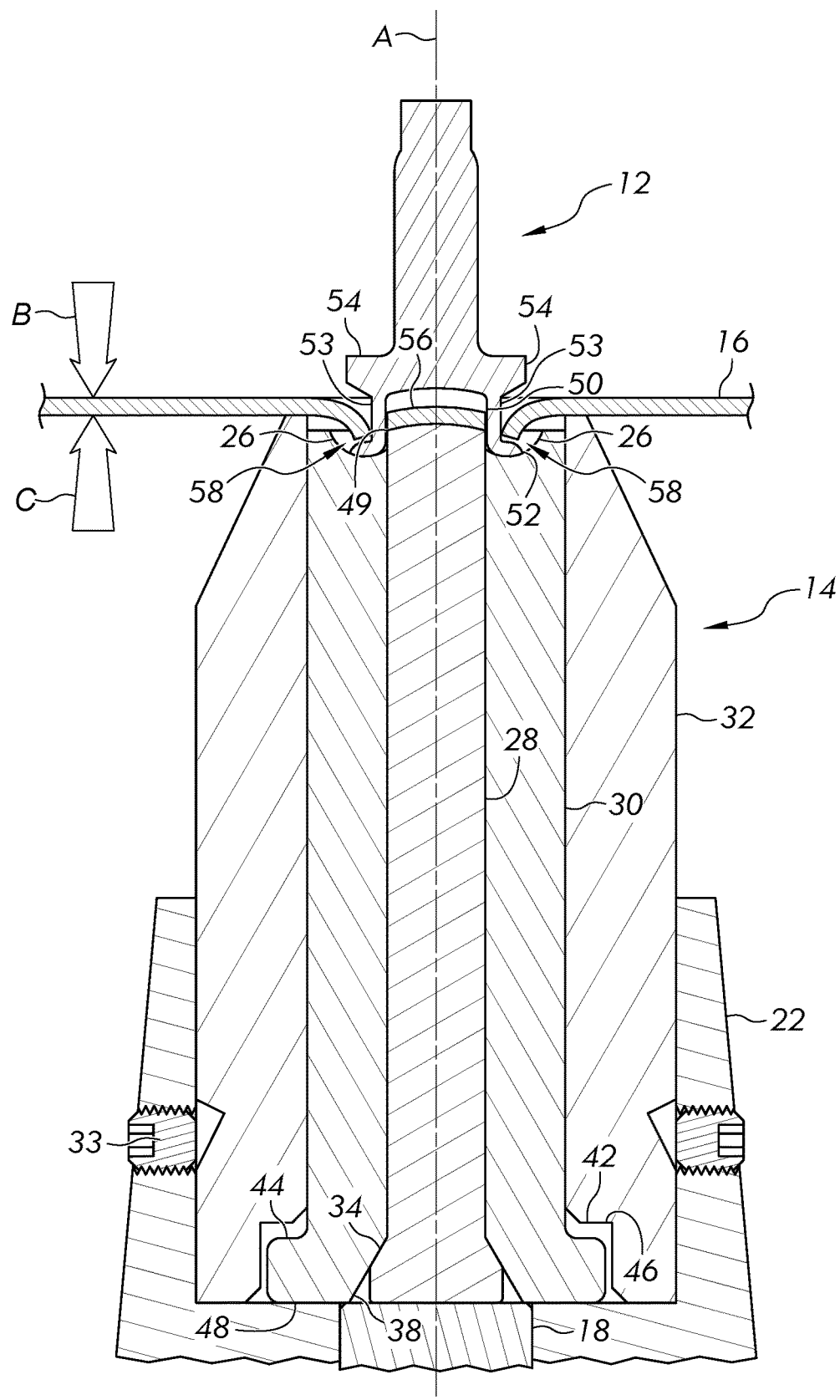

Turning to FIG. 4D, the fastener shearing edge 52 will also contact and travel along the swage 26 (due to the fixed position of the inner sleeve 30). The securing portion 53 of the fastener 12 comprises material that will deform, bending outward, as the fastener shearing edge 52 travels along the curved swage 26.

Figure 4E:
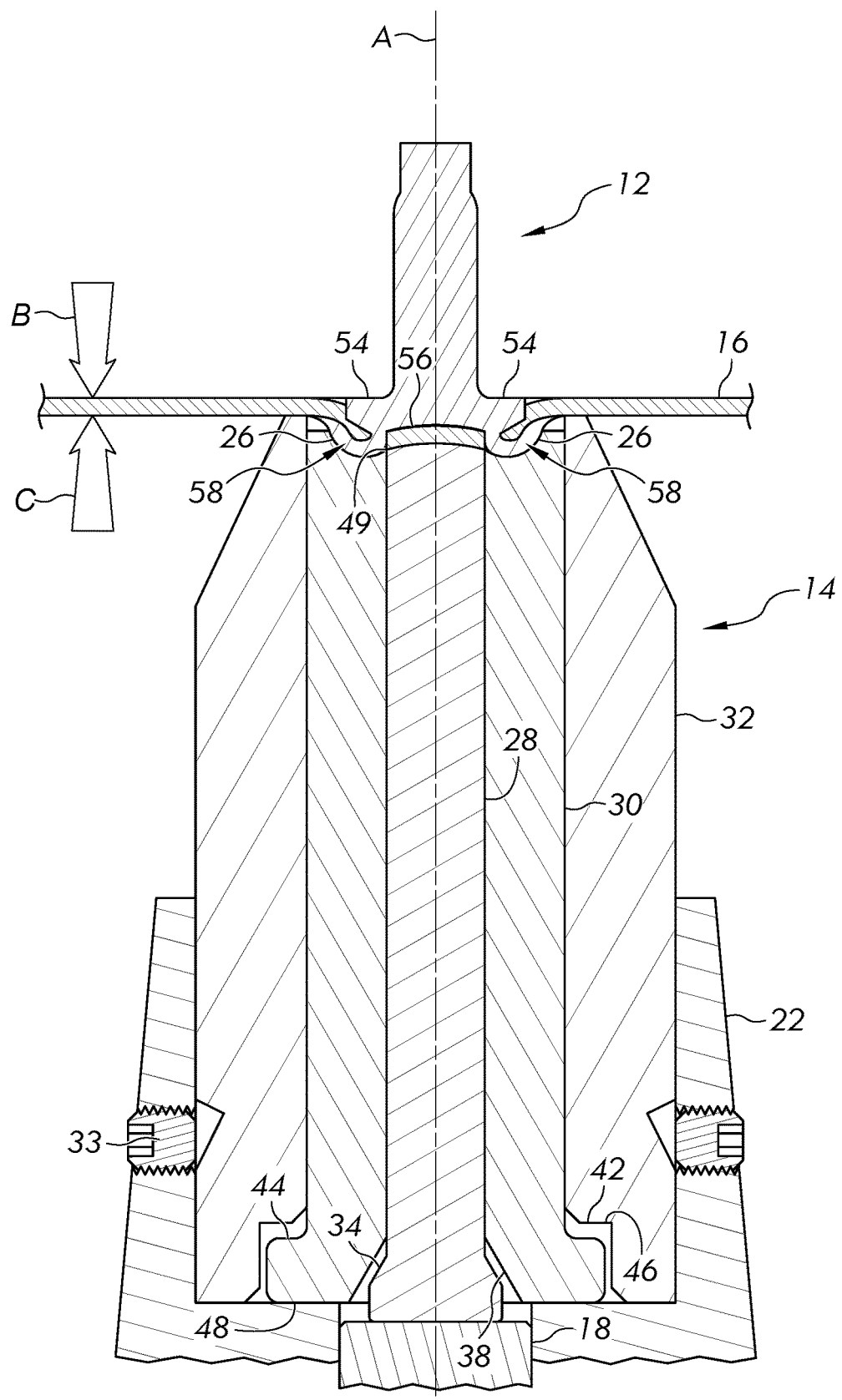

Turning to FIG. 4E, as the securing portion 53 of the fastener 12 continues to travel outwards and upwards along the contours of the swage 26, the securing portion 53 begins to wrap about and capture the bent portion 58 of the panel 16 currently above the swage 26, or at least portions thereof. This captured bent portion 58 can be forcibly displaced upwards in the second direction C above the securing portion 53 of the fastener 12.

Turning to FIG. 4E, movement of the fastener 12 in the first direction B continues until the fastener 12 is in an installed condition. The flange 54 of the fastener 12 is pressed into the panel 16 around the pierced hole, and plastically deforms the upper surface of the panel 16. The portion of the flange 54 that engages the top surface of the panel 16 can include an annular indentation(s) about a frustoconical camming surface, as described in Applicant's previous patents that have been incorporated herein by reference, into which a portion of the panel 16 is forced into thereby locking the clinch nut in place. Due to this further downward movement of the fastener 12, the metal slug 56 is driven further into the fastener opening 50, and may contact a bottom surface thereof. In shown embodiment of FIG. 4E, the center pin 28 and piston rod 18 may be further forced to travel in the first direction B below the lower stop 48 so that all of the securing portion 53 can be bent outward. Because the center pin 28 is separate from the inner sleeve 30, the center pin 28 can move further in the direction B while the inner sleeve 30 is restrained against the stop 48. It is contemplated that the metal slug 56 may be forcibly and permanently trapped within the fastener opening 50, so that no waste material needs to be removed from the machine, or alternatively the metal slug 56 may be discharged and fall by gravity.

Figure 4F:
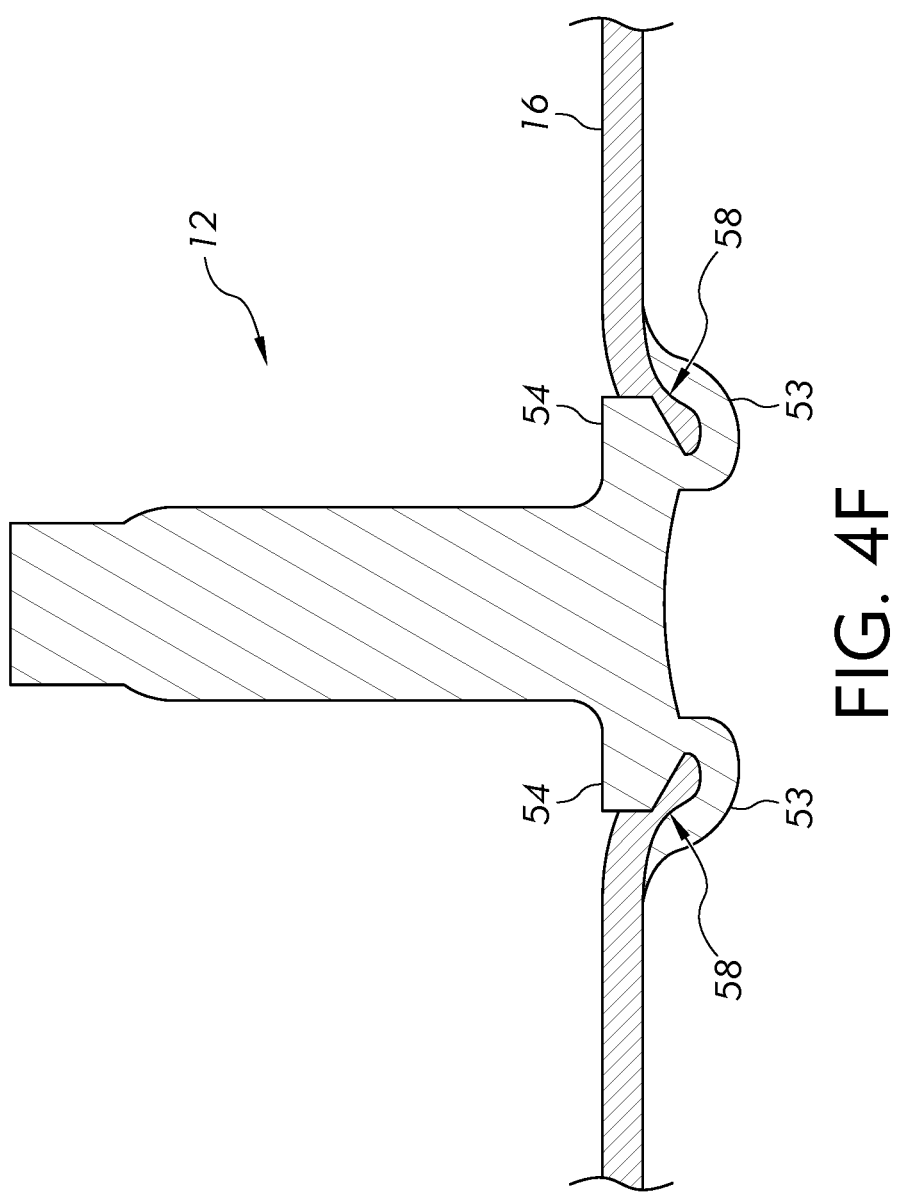

In the installed condition, shown schematically in FIG. 4F, the displaced bent portion 58 of the panel 16 is lockingly sandwiched and clamped between the now bent securing portion 53 and the flange 54. The securing portion 53 of the fastener 12 is bent until the displaced bent portion 58 of the panel becomes trapped between the bent securing portion 53 and the flange 54. In one embodiment, shown in FIGS. 4E and 4F, in the installed condition the entire securing portion 53 is bent outwards. Alternatively, in the installed condition, some portion of the securing portion 53 may not be bent.

Once the fastener 12 is in the installed condition, shown in FIGS. 4E and 4F, the fastener 12 is permanently attached to the panel 16 in a non-removable manner. The a top forming die 11 and die assembly 14 can then be separated from the panel 16 and/or the fastener 12 (see FIG. 4F). Items can then be securely fastened to the fastener 12 (i.e., clinch nut or clinch stud).

The invention has been described herein above using specific examples; however, it will be understood by those skilled in the art that various alternatives may be used and equivalents may be substituted for elements or steps described herein without deviating from the scope of the invention. Modifications may be necessary to adapt the invention to a particular situation or to a particular need without departing from the scope of the invention. It is intended that the invention not be limited to the particular implementation described herein, but that the claims be given their broadest interpretation to cover all embodiments, literal or equivalent, covered thereby.

What is claimed is:

1. A method of permanently attaching a fastener to a plastically deformable panel, said method comprising the steps of:
    placing a fastener shearing edge in contact with a first surface of a panel;
    placing a die assembly in contact with a second surface of the panel that is opposite the first surface, wherein the die assembly comprises at least two slidable components that are axially slidable relative to each other;
    driving the fastener shearing edge against the panel first surface with a pressing force in a first direction;
    driving the die assembly against the panel second surface with a resisting force in a second direction that is opposite the first direction;
    penetrating the fastener shearing edge through the panel to create a hole so that the fastener shearing edge is disposed below the panel second surface, a perimeter of the hole being circumscribed by a bent portion of the panel that is displaced towards the die assembly;
    driving the fastener shearing edge, as the pressing force is applied, into a swage formed as a recess in an end face of one of said at least two slidable components of the die assembly and thereby deforming the fastener shearing edge in the swage to bend the fastener shearing edge outwards along the swage and into contact with the second surface of the panel; and
    trapping the bent portion of the panel circumscribing the hole between the deformed fastener shearing edge abutting the second surface of the panel and a tapered flange formed on an outer surface of the fastener, the tapered flange abutting the first surface of the panel,
    wherein the at least two slidable components of the die assembly comprises:
        a center pin;
        an inner sleeve concentrically disposed about the center pin; and
        an outer shell concentrically disposed about the inner sleeve,
    wherein the center pin and inner sleeve are individually slidable relative to each other and relative to the outer shell.

2. The method according to claim 1, wherein the step of driving the fastener shearing edge into the swage further includes displacing said end face comprising the swage a distance in the first direction and away from the second surface of the panel.

3. The method according to claim 2, wherein said distance that the end face comprising the swage is displaced is sufficient to enable the fastener shearing edge to be located vertically below the bent portion of the panel circumscribing the hole.

4. The method according to claim 3, wherein said distance that the end face comprising the swage is displaced is limited by a physical stop to a maximum distance, and the step of trapping the bent portion of the panel occurs after the end face comprising the swage is displaced at the maximum distance.

5. The method according to claim 1, wherein the pressing force is greater than the resisting force.

6. The method according to claim 1, wherein the step of driving the die assembly against the panel second surface with the resisting force comprises driving a piston rod against the center pin in the second direction to thereby contact the center pin against the panel second surface, the center pin slidably moving relative to the inner sleeve.

7. The method according to claim 6, wherein the resisting force is provided by a pneumatic actuator operably coupled to a control module that maintains the resisting force at a predetermined constant value, wherein the pneumatic actuator is operably connected to the piston rod.

8. The method according to claim 6, wherein the center pin comprises a flange configured to interact with a surface of the inner sleeve such that when the piston rod slidably moves the center pin in the second direction and the center pin is displaced a predetermined distance, the center pin flange abuts against said surface of the inner sleeve to drive the inner sleeve against the panel second surface.

9. The method according to claim 6, wherein the inner sleeve includes an outward extending flange configured to interact with an inner shoulder surface of the outer shell.

10. The method according to claim 9, wherein the outer shell is positionally secured to prevent movement of the outer shell in either of the first and second directions when the inner sleeve flange presses against the shoulder surface of the outer shell.

11. A method of permanently attaching a fastener to a plastically deformable panel, said method comprising the steps of:
    placing a circular fastener shearing edge in contact with a first surface of a panel;
    placing a die assembly in contact with a second surface of the panel that is opposite the first surface,
    wherein the die assembly comprises an outer shell in contact with the second surface of the panel, and the outer shell is concentrically disposed about an inner sleeve with an inner sleeve end face, and the inner sleeve is concentrically disposed about a center pin with a center pin end face, wherein the center pin end face and the fastener shearing edge are coaxial;
    driving the fastener shearing edge against the panel first surface with a pressing force in a first direction;
    driving the center pin end face against the panel second surface with a resisting force in a second direction opposite the first direction, wherein the center pin includes a flange that presses against an inner surface of the inner sleeve driving the inner sleeve end face against the panel second surface;
    penetrating the fastener shearing edge through the panel to create a hole so that the fastener shearing edge is disposed below the panel second surface, a perimeter of the hole being circumscribed by a bent portion of the panel that is displaced towards the die assembly;

driving the fastener shearing edge, as the pressing force is applied, into a swage formed as a recess in the inner sleeve end face and thereby deforming the fastener shearing edge in the swage to bend the fastener shearing edge outwards along the swage and into contact with the second surface of the panel; and sandwiching the bent portion of the panel circumscribing the hole between the deformed fastener shearing edge abutting the second surface of the panel and a fastener flange formed on an outer surface of the fastener, the fastener flange abutting the first surface of the panel, wherein the step of driving the fastener shearing edge into the swage causes at least a portion of the center pin to enter a hollow opening of the fastener that is circumscribed by the fastener shearing edge.

12. The method according to claim 11, the step of driving the fastener shearing edge into the swage further includes displacing the inner sleeve a distance in the first direction and away from the second surface of the panel, wherein said distance is sufficient to enable the fastener shearing edge to be located vertically below the bent portion of the panel circumscribing the hole.

13. The method according to claim 12, wherein the center pin and inner sleeve are individually slidable relative to each other and relative to the outer shell, and wherein said distance that the inner sleeve is displaced is limited by a physical stop to a maximum distance, and the step of sandwiching the bent portion of the panel occurs after the inner sleeve is displaced at the maximum distance.

14. The method according to claim 11, wherein the swage comprises a continuous annular recess on the end face of the inner sleeve, and a terminal edge of the swage is immediately adjacent to and constrained by the center pin.

* * * * *